United States Patent
Smith

[15] 3,699,914
[45] Oct. 24, 1972

[54] LIQUID LEVEL INDICATORS
[72] Inventor: Terry Reginald Smith, Cremorne, New South Wales, Australia
[73] Assignee: Smith Industries Limited, London, England
[22] Filed: June 11, 1971
[21] Appl. No.: 152,212

[52] U.S. Cl. ............116/118, 33/126.7, 73/425.4 P, 73/425.6
[51] Int. Cl. .............................................G01f 23/00
[58] Field of Search...........116/118, 117 B; 33/126.4, 126.7; 73/297, 323, 303, 425.6, 425.4

[56] References Cited

UNITED STATES PATENTS

| | | |
|---|---|---|
| 2,756,716 | 7/1956 | Petrossian .................116/118 |
| 2,840,035 | 6/1958 | La Porte....................116/118 |
| 2,930,238 | 3/1960 | Kellett...................73/425.4 P |
| 3,316,647 | 5/1967 | Swallert....................33/126.7 |
| 3,354,723 | 11/1967 | Smith .......................73/425.6 |

Primary Examiner—Louis J. Capozi
Attorney—William D. Hall et al.

[57] ABSTRACT

An indicator for detecting the sufficiency or insufficiency of oil level in the sump of a vehicle engine, wherein detection is dependent upon the creation of a vacuum between a ball valve device within the engine and an external vacuum source. If the oil level is sufficient, operation of the vacuum source causes the ball to close the valve device whereby the required vacuum is created and detected. If the oil level is insufficient, the valve device remains open, even if the vacuum source is operated (that is, the ball stays off its valve seat) so that the required vacuum is not created and this fact can be detected upon operation of the vacuum source.

7 Claims, 4 Drawing Figures

PATENTED OCT 24 1972

Terry Reginald Smith
Inventor by Elliott Pollock
Attorney

LIQUID LEVEL INDICATORS

This invention relates to liquid level indicators and is particularly applicable to indicators for indicating the level of oil in the sump of a land vehicle's engine.

According to this invention there is provided a liquid level indicator comprising a manually operable vacuum source and a ball valve to be connected to the vacuum source, wherein said ball valve comprises a tubular member, a valve seat at least adjacent one end of said tubular member, an opening in said tubular member spaced from said valve seat and to be located at a desired liquid level, and a ball nested within the tubular member to co-operate with said valve seat; and wherein the relative dimensions of the tubular member and of the ball are such that, upon the application from said source of at least a partial vacuum, liquid entering the tubular member through said opening causes the ball to engage the valve seat, and such that, after subsequently relieving said vacuum, the liquid tends to drain out of the tubular member and permits the ball to move away from the valve seat.

Where the liquid level indicator is adapted to indicate the oil level in the sump of a vehicle engine, preferably with the tubular member adapted to be inserted into the hole in the sump normally provided for the dipstick, then if the oil is above said opening, oil is drawn into the tubular member with the consequence that the ball valve is closed. Consequently the partial vacuum which is created may be sensed or detected. The viscosity of the oil and its movement provide a force on the ball in the sense to move it towards the valve seat; and this ball may be of lesser or greater density than the oil.

If an attempt is made to apply a vacuum to the tubular member when the oil level is below said opening, air is drawn into the tubular member so that the ball does not engage the valve seat and the air relieves the tendency to vacuum application. Consequently not even a partial vacuum may be sensed or detected.

The weight of the ball should be sufficient to ensure that it can move away from the valve seat when said vacuum is relieved or released; and preferably the ball valve includes means to limit this movement away from the valve seat. In one arrangement said means may comprise at least one indentation in the tubular member and engageable by the ball; and in another arrangement said means may comprise a stop member retained within said tubular member to be engageable by the ball. Preferably the stop member is retained by indentations formed inwardly of the tubular member. Conveniently the stop member extends outwardly of said tubular member from an end thereof opposite said one end and tapers inwardly.

In a suitable arrangement the valve seat is flared. Preferably the vacuum source is a suction pump having a manually actuable control member operatively connected to a piston.

The indicator may comprise a vacuum detector having a normally obscured indicating member located in the path of movement of the piston and spaced from a datum position of the piston, the indicating member being moved to a position in which it is visible when it is engaged by the piston.

A further indicating member may be connected to the control member through a spring. Preferably the two indicating members, which may have contrasting colors, are cylindrical, said further indicating member being surrounded by the first mentioned indicating member which is itself surrounded by spring means urging the piston towards its datum position. Conveniently said spring is helical and is surrounded by the further indicating member which one of the ends of said spring engages, the other end of said spring being in engagement with a piston actuating rod.

By way of example, embodiments of this invention will now be described, reference being had to be accompanying drawings of which:

Figure 1:
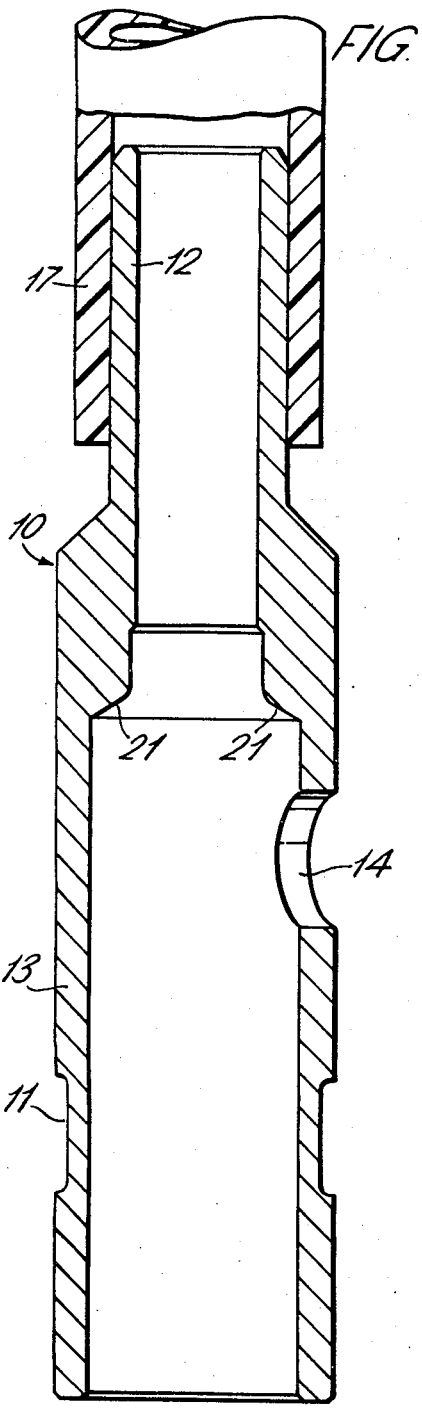
FIG. 1 shows in longitudinal cross-section a tubular member prior to the insertion therein of a ball.
Figure 2:
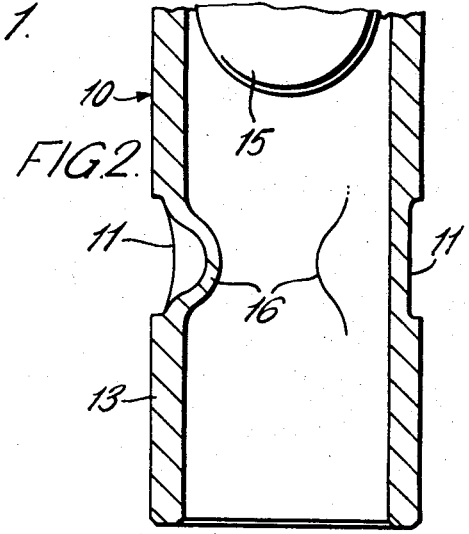
FIG. 2 is a part view in longitudinal cross-section of the tubular member of FIG. 1 after insertion of the ball.

Referring first to FIGS. 1 and 2, a mild steel tubular member 10 has attached to an upper end portion 12 of narrower diameter a capillary-like flexible tube 17 of metal or preferably plastics material (e.g. nylon). The tubular member 10 is intended to be inserted into a hole of the sump of a vehicle engine, preferably the hole normally provided for the usual dipstick. When inserted into such a hole, a rubber washer (not shown) retained on the tubular member 10 or the tube 17 by a positionally adjustable spring clip (also not shown) engages the wall of the hole or the surface of the sump around the hole and forms a seal. The lower portion 13 of the tubular member 10 is initially provided with an external annular groove 11 (FIG. 1) and is open at its bottom end. An opening 14 formed in the portion 13 is to be disposed at the level in the sump below which it is intended that the oil shall not fall. A metal ball 15 (FIG. 2) of higher density than that of oil is disposed within the tubular member 10, and when the tubular member 10 contains little or no oil the ball 15 rests against stops 16 formed by inward clenching of the groove 11 at three equi-spaced locations (FIG. 2). In this position of the ball 15, fluid can still pass up the tubular member 10 between the ball and the internal surface of the tubular member's lower portion 13. The intersection between the narrower diameter upper end portion 12 and the wider diameter lower end portion 13 of the tubular member 10, is flared to provide a tapering valve seat 21 with which the ball 15 can co-operate.

Figure 3:
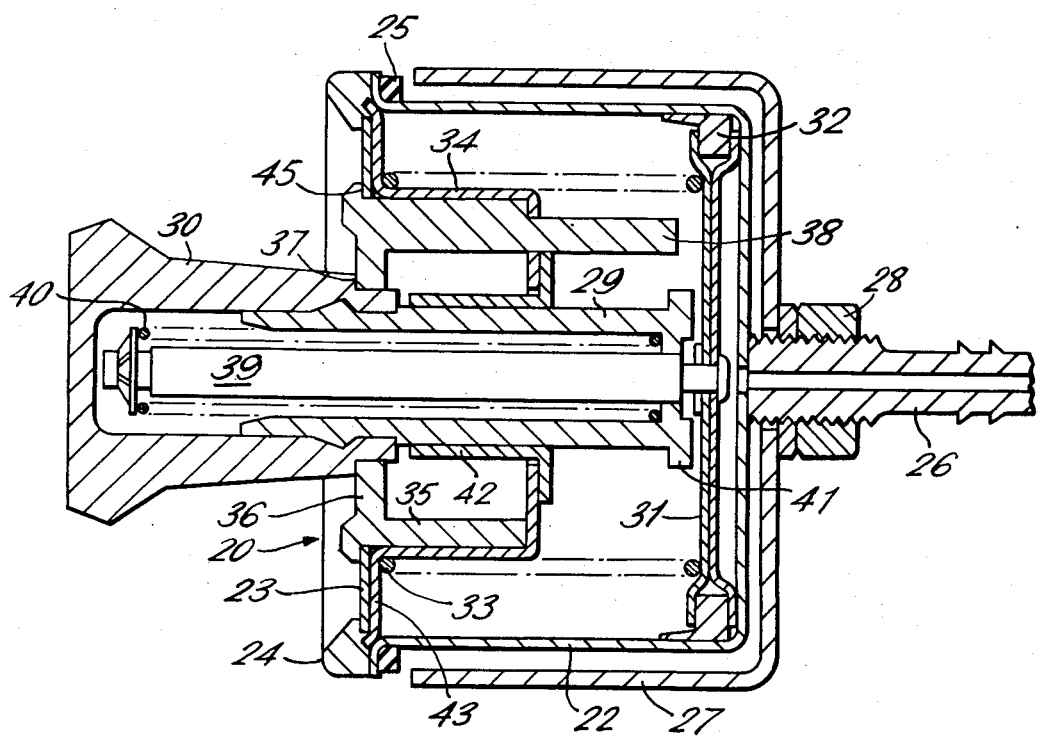
FIG. 3 is a sectional side elevation of a manually operable vacuum source.

Referring now to FIG. 3, a manually operable vacuum source is constituted by a suction pump 20 having a cup-shaped member 22 which has an annular front plate 23 secured to its mouth by means of a chromium-plated bezel 24 and has a central hole in its base. A rubber ring 25, resting against a narrow rim at the mouth edge of the cup-shaped member 22 and against the bezel 24, is intended to be held against the edge of a hole in the dashboard of a vehicle, the cup-shaped member 22 extending rearwardly through the hole. A hollow adaptor 26 is secured to the center of the base of the member 22 and has an external thread. A U shaped strap 27 bent from metal strip has a hole at the center of its base through which the adaptor 26 passes. The edges of the strap 27 are intended to engage the rear surface of the dashboard and the strap 27 is intended to be held in position by means of a nut 28 screwed on to the exterior of the adaptor 26. One end of the tube 17 (FIG. 1) is pushed over the upper end portion 12 of the ball valve and the other end is pushed over the adaptor 26 so that the tube 17 connects the interior of the tubular member 10 with the interior of the cup-shaped member 22.

A sleeve 29 extends along the axis of the suction pump, passes through the front plate 23, carries at its outer end a manually operable knob 30 (constituting a control member), and at its inner end is in proximity with a piston 31. The sleeve 29 and the knob 30 are moulded from a plastics material, e.g. polypropylene. The piston 31 consists of two plates held together and carries around its periphery a synthetic rubber lip-seal 32 which engages the inner cylindrical surface of the cup-shaped member 22. A further shallow cup-shaped member 34 has a radially extending annular flange 43 which lies under the plate 23, and is disposed (other than the flange 43) within a helical compression spring 33 that acts between the flange 43 and the piston 31 to urge the latter towards the base of the cup-shaped member 22. An annulus 35 lies within the cup-shaped member 34, surrounds the sleeve 29 and is integral at its front end with an inwardly projecting flange 36 engageable with a shoulder 37 formed in the knob 30. The dimensions of the annulus 35 are such that it can move through the central hole of the late 23. The annulus 35 and the flange 36 are moulded from a brightly colored plastics material such as A.B.S. The color of the annulus 35 (it may for example be red) contrasts with the color of the outer surface of the sleeve 29 (which may be green). Three integral pins 38 extend inwardly from the inner end of the annulus 35 and pass through holes in the base of the cup-shaped member 34, the inner end of each pin 38 being adjacent to the piston 31.

A pin 39 located within the sleeve 29 is staked at its lower end to the piston 31 (thereby serving to hold together the two plates of the piston) and constitutes a piston actuating rod. A compression spring 40 which surrounds the pin 39 engages at its outer end the pin 39 and, at its inner end, an inwardly projecting ledge of the sleeve 29 and serves to urge the piston 31 towards the sleeve 29. A tubular guide 42 secured to the base of the member 34 guides the longitudinal movement of the sleeve 29. A flange 41 is formed on the sleeve 29 and co-operates with the guide 42 to limit the outward movement of the sleeve 29 and the knob 30 snap-fitted over the sleeve 29.

The inward movement of the sleeve 29 and the knob 30 is limited by a lip 45 on the annulus 35, the lip 45 is being engageable with the plate 23 so that, at rest, the inner end of the sleeve 29 is separated by a small distance from the piston 31.

The mode of use of the oil level indicator will now be described. To determine the level of oil in the sump, an operator (e.g. the vehicle driver) pulls the knob 30 out to the fullest extent possible and in so doing he exposes the green exterior surface of the sleeve 29 and also compresses the spring 40. The spring 40 exerts a force on the pin 39 (the piston actuating rod) and the piston 31, and moves them outwardly (to the left in FIG. 3) against the action of the spring 33. As a result of the engagement of the lip seal 32 carried by the piston 31 with the inner cylindrical surface of the cup-shaped member 22, the outward movement of the piston 31 produces a partial vacuum in the tube 17 and this partial vacuum is transmitted to the interior of the tubular member 10 (FIG. 1).

Assuming the level of the oil in the sump is above the opening 14, oil is drawn further into the tubular member 10 towards the shoulder 21. As the oil rises in the tubular member 10 it causes the ball 15 to rise until the ball engages the shoulder 21 serving as the valve seat. The ball 15 reaches the shoulder 21 quickly because it is prevented from being too remote from the valve seat by the stops 16. The partial vacuum within the tube 17 is maintainable since there is no relief therefor by the entry of air. Consequently the force exerted by the spring 40 is sufficiently counteracted so that the piston 31 does not move very far and the green exterior surface of the sleeve 29 remains exposed. This indicates to the operator that it is not necessary to add further oil to the sump. When the operator releases the knob 30, the spring 40 brings the sleeve 29 into engagement with the piston 31 and the spring 33 brings the piston 31 back into its original position in engagement with the base of the cup-shaped member 22. The vacuum is thus removed or relieved so that the ball 15 moves away from the shoulder 21 by the pressure of air within the tube 17 and by its own weight, and returns to its original position of being supported by the stops 16. The oil then drains back into the sump.

If the level of oil in the sump is below the opening 14 when the knob 30 is pulled, air is drawn into the tubular member 10 when the spring 40 moves the piston 31 away from the base of the cup-shaped member 22. The ball 15 does not move and air is drawn into the tube 17 through the passage 18 relieving the tendency to vacuum application. The force of spring 40 being thus insufficiently counteracted, the piston 31 is now able to move further outwards so that it strikes the pins 38 and pushes the annulus 35 through the plate 23. The annulus 35 covers the exposed portion of the sleeve 29 and the red-colored external surface of the annulus 35 indicates to the operator that oil should be added to the sump. When the operator releases the knob 30, the spring 33 returns the piston 31 to its original position, the annulus 35 being returned to its original position by the shoulder 37 which engages the flange 36.

It is to be noted that the viscosity of the oil and its upward movement in the tubular member 10 assists in moving the ball 15 upwardly into engagement with the valve seat 21 and this viscous drag effect is sufficient to operate the ball valve even if the ball 15 is denser than oil.

The space between the ball and the internal surface of the tubular member's lower end portion 13 is sufficient to permit the oil to drain away from the open bottom of tubular member 10 when the knob 30 is released.

Figure 4:
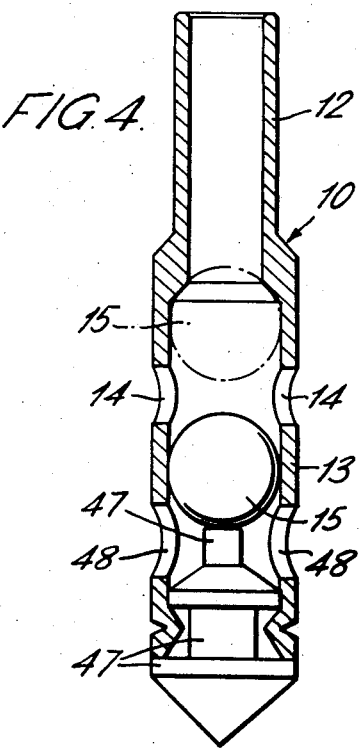
FIG. 4 is a longitudinal cross-section of an alternative tubular member.

In an alternative ball valve illustrated in FIG. 4, the opening 14 extends diametrically through the tubular member 10 whose bottom is closed by a plug 47 retained therein by staking at two diametrically opposite locations into a circumferential groove in the plug. The innermost end of the plug 47 is of much smaller diameter and serves as a stop to movement of the ball 15 away from the valve seat 21; the outermost end of the plug 47 being conically shaped as it extends outwardly of the tubular member to facilitate insertion of the tubular member 10 through a sinuous bore leading into a vehicle engine's sump. To permit the oil to drain away when the knob 30 is released, a cross-bore 48 is provided diametrically through the tubular member 10 in the vicinity of the plug's innermost end. It will be appreciated that the ball 15 is represented in FIG. 4 in its rest position and valve-closed position by respectively full and broken lines.

In a modification of the suction pump of FIG. 3, the knob 30 extends to, and is connected directly to, the piston 31; and the sleeve 29, the pin 39 and the spring 40 are omitted. Further, the annulus 35 with its flange 36 and pins 38, the member 34 and the guide 42 are omitted and the plate 23 is extended inwardly to provide a guide for the knob 30. With this modified arrangement, instead of a visual indication being given of the level of oil the resistance to motion of the knob 30 which is felt when the knob 30 is pulled when the oil is above the required level, is an indication that adequate oil is provided. As will be appreciated no such resistance to motion will be felt upon the knob being pulled when the oil is below the required level, and it is then possible to pull the piston 31 through the full length of the cup-shaped member 22.

The liquid level indicator just described is suitable for mounting in the engine compartment of a vehicle and in this case the bezel 24 is omitted and the plate 23 is extended outwardly to act as a bracket for attaching the device to the vehicle and also for carrying the instruction legend. The member 22 is in this case secured, e.g. by welding, to the plate 23. The knob 30 may be replaced by an outwardly projecting ring.

It will be appreciated that the forms of modification described in the two previous paragraphs are significantly cheaper than the arrangement shown in the drawings. These forms of modification could be varied still further by eliminating the knob 30 entirely and connecting the piston 31 through a flexible push-pull cable to a knob located inside the vehicle, the cup-shaped member 22 with its piston 31 remaining in the engine compartment of the vehicle.

I claim:

1. A liquid level indicator comprising a manually operable vacuum source and a ball valve to be connected to the vacuum source wherein said ball valve comprises a tubular member, a valve seat, an opening in said tubular member spaced from said valve seat and to be located at a desired liquid level, and a ball nested within the tubular member to co-operate with said valve seat; and wherein the relative dimensions of the tubular member and of the ball are such that, upon the application from said source of at least a partial vacuum, liquid entering the tubular member through said opening causes the ball to engage the valve seat, and such that, after subsequently relieving said vacuum, the liquid tends to drain out of the tubular member and permits the ball to move away from the valve seat.

2. An indicator according to claim 1, wherein the ball valve comprises means to limit movement of the ball away from the valve seat, said means including at least one indentation in said tubular member.

3. An indicator according to claim 2, wherein the movement limiting means includes a stop member retained by said at least one indentation within said tubular member to project out of the tubular member from an end opposite said one end, the outward projection of said stop member reducing in cross-section as it so projects.

4. A liquid level indicator comprising a manually operable vacuum source, a valve device, and means for coupling the valve device to said vacuum source; wherein said vacuum source is a suction pump having a manually actuable control member, a piston, and means for operatively connecting the control member to the piston; and wherein the valve device comprises a tubular member having an opening therein spaced from one end thereof to be located at a desired liquid level, a valve seat at least adjacent said one end of the tubular member, and a valve member to cooperate with said valve seat, the valve member being a ball nested within the tubular member for engagement with the valve seat under the viscous drag effect of liquid flow from said opening towards said valve seat upon the application of at least a partial vacuum from said source, yet be disengageable therefrom upon the removal of said at least partial vacuum.

5. An indicator according to claim 4, wherein said suction pump additionally comprises a vacuum detector having a normally obscured indicating member that is located in the path of movement of said piston and is spaced from a datum position of said piston, said indicating member being movable upon engagement by the piston to a position in which it is visible.

6. An indicator according to claim 5, wherein said vacuum detector additionally comprises a further indicating member surrounded by said first-mentioned indicating member, first spring means interconnecting the aforesaid control member and said further indicating member, and second spring means to urge the piston towards its datum position.

7. An indicator according to claim 6, wherein the two indicating members are provided with cylindrical surfaces of contrasting colors.

* * * * *